J. A. BOLCH.
PACKING FOR PISTON RODS.
APPLICATION FILED NOV. 30, 1910.
1,000,890.
Patented Aug. 15, 1911.
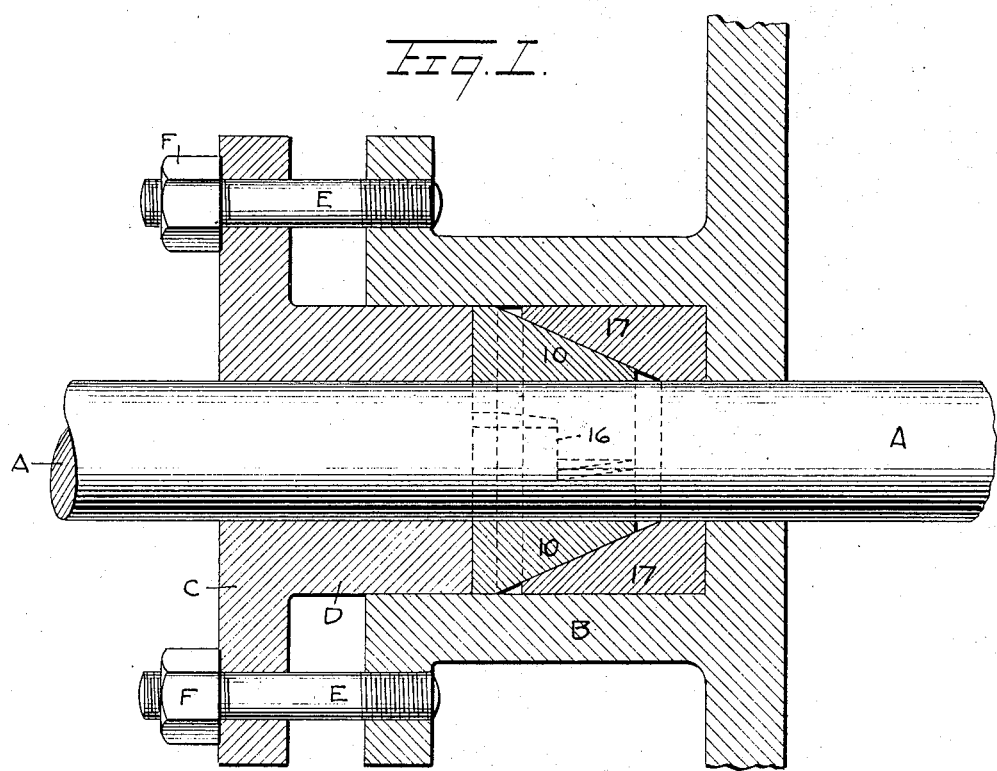
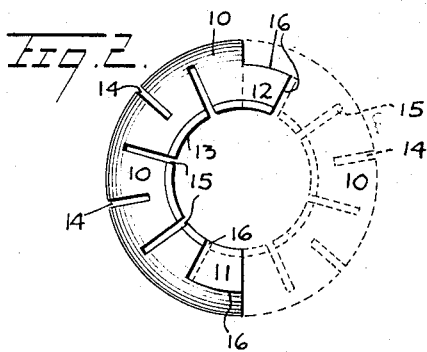
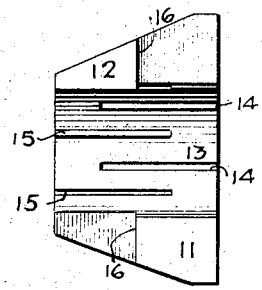
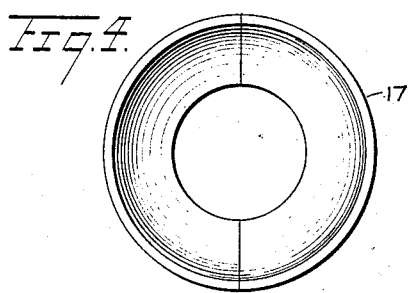
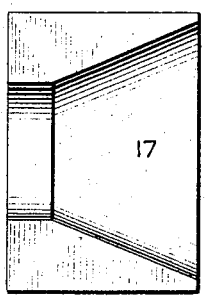
WITNESSES
INVENTOR
Joseph A. Bolch
BY
ATTORNEYS

UNITED STATES PATENT OFFICE.

JOSEPH A. BOLCH, OF NEW YORK, N. Y.

PACKING FOR PISTON-RODS.

1,000,890.  Specification of Letters Patent.  Patented Aug. 15, 1911.

Application filed November 30, 1910. Serial No. 594,877.

*To all whom it may concern:*

Be it known that I, JOSEPH A. BOLCH, a citizen of the United States, and a resident of the city of New York, borough of Manhattan, in the county and State of New York, have invented a new and Improved Packing for Piston-Rods, of which the following is a full, clear, and exact description.

Among the principal objects which the present invention has in view are: to provide a packing for piston rods universally contractible to preserve the parallel relation of the bearing surface to the piston rod; and to provide an elongated packing for piston rods constructed from metal and arranged to contract evenly throughout its length upon the said rod.

With these objects in view the invention consists primarily in constructing a plurality of matched segmental blocks constructed from bearing metal, bored to fit the piston rod and provided with a series of longitudinally disposed non-communicating slots, said slots being longitudinally disposed and transversely extended through the metal forming opposite ends of said blocks; and in providing for the compression of said blocks a shrinking collar.

It further consists in providing a plurality of segmental cone-shaped matched blocks, said blocks being provided with a series of longitudinally disposed slots extended transversely through the walls of said matched blocks, and said slots opening alternately through opposite ends of each of said blocks; and in providing for the compression of said cone-shaped blocks a solid cone cup and packing glands for the compression of said cup upon said blocks.

One embodiment of the present invention is disclosed in the structure illustrated in the accompanying drawings, in which like characters of reference denote corresponding parts in all the views, and in which—

Figure 1 is a fragmentary view in longitudinal section of a packing gland or steam piston having packing members constructed and arranged in accordance with the present invention; Fig. 2 is an end view of one of the bearing blocks, showing in conjunction therewith, in dotted lines, the gland bearing block; Fig. 3 is a side view of one of the bearing blocks; Fig. 4 is an end view of the compression cup; and Fig. 5 is a side view of the compression cup.

In the drawings, the contractible packing blocks 10 are shown as segments of cone. Each segment is provided with a base projection 11 and a top projection 12. The said projections 11 and 12 are fitted or matched so that when the blocks 10 are brought together the horizontal joint of the said projections form a close and steam-tight fit. The longitudinal walls of the said projections and the butting wall of the opposite member do not normally contact until the bearing surface 13 of each of the blocks is so worn that the matched blocks are so contracted as to bring the said walls together.

Each of the blocks 10 is provided with a series of slots 14, which slots are extended from the base of the blocks toward the apex of the cone. The slot is not, however, carried through the entire cone or through the end butting the apex of the cone, as shown in Figs. 2 and 3 of the drawings. A complemental series of slots 15 is formed in each of the blocks, said slots 15 opening into the blocks from the cone apex of said blocks. The slots 15 are terminated short of the base of the blocks. The slots thus formed in the blocks, in conjunction with the slots formed by the separation of the end walls of the projections 11 and 12 with the wall of the blocks adjacent said end walls, form a metallic elongated collar surrounding the piston or other rod, the longitudinal sections whereof are contractible to form in the said blocks a cone of smaller base diameter.

It will be noted that with the closure of the joint 16 between the horizontal walls of the projections 11 and 12 the longitudinal slots formed in the blocks do not communicate, therefore steam or other power producing expansion medium does not pass longitudinally through the said blocks.

The blocks are contracted by forcing the same into a hard metal cup 17. The cup 17 is preferably formed of separable half sections which may be adjusted over the piston rod A and inserted in the gland box B, the gland head C being removed to permit the insertion and removal of the cup 17. The gland head C is provided with a plunger boss D fitting within the box B, adapted to extend therein as a plunger to move forward the matched blocks 10, 10 into the recess of the cup 17. The gland head C is drawn to the box B by means of screw bolts E, E.

In operation the sections of the cup 17 are placed in the bottom of the box B, which box is cast on the cylinder or steam chest head. The box section being inserted and adjusted, the matched blocks 10, 10 are placed over the piston rod or valve stem A and inserted within the box B and bushed into the cup. The gland head C is then moved forward on the rod A until the boss D impinges upon the back of the matched blocks 10, 10 to force the same within the recess of the cup 17, and by means of the nuts F, F the head C is forced forward to drive the matched blocks 10, 10 into the recess of the cup 17 until the said blocks yield to contract the rod or diameter of the bore until the blocks fit closely upon the rod A.

As subsequent wear occurs this is indicated by leakage of steam about the rod A, and is corrected by turning the nuts F, F to thereby contract the blocks 10, 10 to closer adjustment upon the rod A.

Having thus described my invention, what I claim as new and desire to secure by Letters Patent is:—

1. In a packing for piston rods, a plurality of interlocked conical metal packing blocks, each of said blocks having formed therein open ended oppositely extended longitudinally lapped slots.

2. In a packing for piston rods, a plurality of matched conical metal packing blocks, said blocks having formed therein open ended oppositely extended longitudinally lapped slots, and said blocks being further provided with overlapping end sections the longitudinal walls whereof are normally separated and the transverse walls whereof are closely fitted.

3. In a packing for piston rods, the combination with a plurality of interlocked conical metal packing blocks, each of said blocks having formed therein open ended oppositely extended longitudinally lapped slots, of a cone shaped container adapted to infold said packing blocks; and means for forcing said container upon said packing blocks.

4. In a packing for piston rods, the combination with a plurality of interlocked conical metal packing blocks, each of said blocks having formed therein open ended oppositely extended longitudinally lapped slots, of a conical two-part container adapted to infold said blocks; and means for forcing said container upon said packing blocks.

5. In a packing for piston rods embodying a gland box, a gland head provided with a boss for extension within said box, and means for forcing said extension within said box; an inverted conically cupped filling member inserted in said box; and a plurality of interlocked conical metal packing blocks, each of said blocks having formed longitudinally therein open ended oppositely extended lapped slots.

6. In a packing for piston rods embodying a gland box, a gland head provided with a boss for extension within said box, and means for forcing said extension within said box; an inverted conically cupped filling member inserted in said box; and a plurality of matched conical metal packing blocks, said blocks having formed therein open-ended oppositely extended longitudinally lapped slots, and said blocks being further provided with overlapping end sections the longitudinal walls whereof are normally separated and the transverse walls whereof are closely fitted.

7. In a packing for piston rods embodying a gland box, a gland head provided with a boss for extension within said box, and means for forcing said extension within said box; an inverted conically cupped filling member inserted in said box; and a plurality of matched packing blocks constructed from non-resilient material, said blocks having formed therein open-ended oppositely disposed longitudinally lapped slots, and said blocks being further provided with over-lapping side sections the longitudinal walls whereof are normally separated and the transverse walls whereof are closely fitted.

In testimony whereof I have signed my name to this specification in the presence of two subscribing witnesses.

JOSEPH A. BOLCH.

Witnesses:
E. F. MURDOCK,
JOHN P. DAVIS.